J. F. SCHERER & F. J. GEORGE.
TRACTION DEVICE FOR AUTOMOBILE WHEELS.
APPLICATION FILED OCT. 22, 1917.
1,273,930.
Patented July 30, 1918.
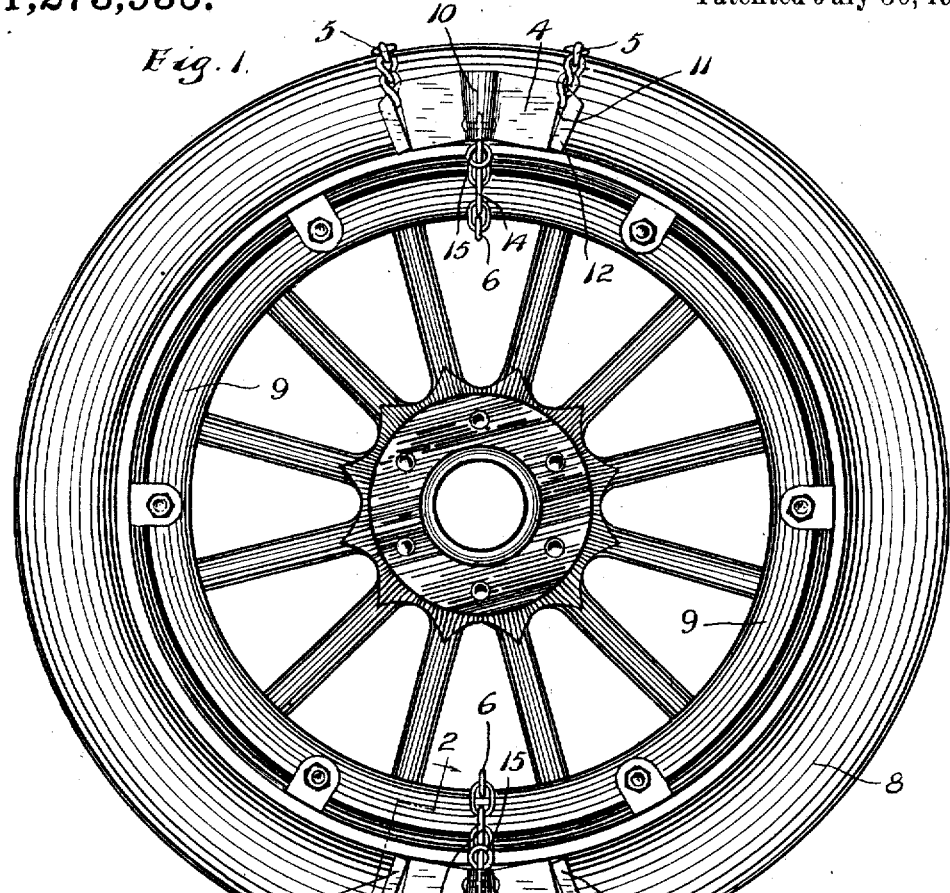
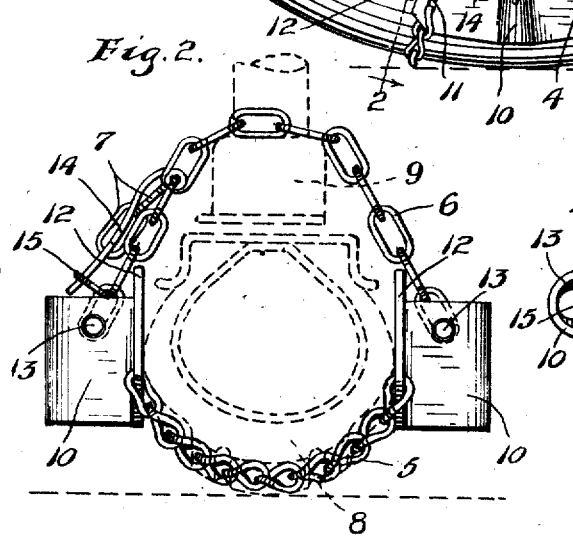
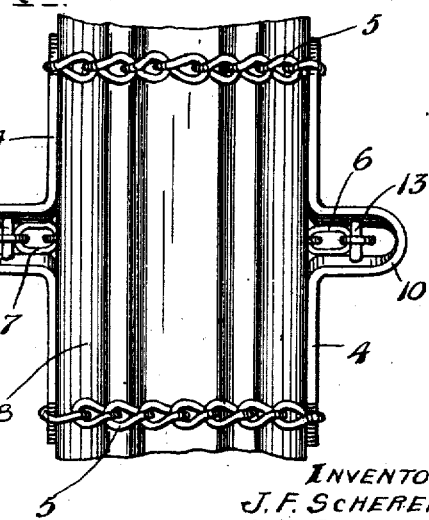
WITNESSES
H. L. Opsahl
E. C. Wells
INVENTORS
J. F. SCHERER.
F. J. GEORGE
BY THEIR ATTORNEYS
Williamson Merchant

UNITED STATES PATENT OFFICE.

JOHN F. SCHERER AND FREDERICK J. GEORGE, OF MINNEAPOLIS, MINNESOTA.

TRACTION DEVICE FOR AUTOMOBILE-WHEELS.

1,273,930.　　　　　　　　　Specification of Letters Patent.　　Patented July 30, 1918.

Application filed October 22, 1917.　Serial No. 197,828.

*To all whom it may concern:*

Be it known that we, JOHN F. SCHERER and FREDERICK J. GEORGE, citizens of the United States, residing at Minneapolis, in the county of Hennepin and State of Minnesota, have invented certain new and useful Improvements in Traction Devices for Automobile-Wheels; and we do hereby declare the following to be a full, clear, and exact description of the invention, such as will enable others skilled in the art to which it appertains to make and use the same.

Our invention relates to a traction device for automobile wheels and has for its object to provide such a device that is both anti-skidding and anti-slipping.

To the above end, the invention consists of the novel devices and combinations of devices hereinafter described and defined in the claims.

In the accompanying drawings, which illustrate the invention, like characters indicate like parts throughout the several views.

Referring to the drawings,

Figure 1 shows an automobile wheel equipped with a pneumatic tire, having two of the improved traction devices applied thereto;

Fig. 2 is an end elevation of one of the traction devices applied to the automobile wheel and tire, said wheel and tire being diagrammatically illustrated by means of broken lines as they would appear in section taken on the irregular line 2—2 of Fig. 1, on an enlarged scale; and Fig. 3 is a tread view of the parts shown in Fig. 2, with the exception that the tire is shown by means of full lines.

The improved traction device comprises a pair of side plates 4, a pair of tread chains 5 and a two-part anchoring chain 6 and 7. The side plates 4 are flat and arranged to engage the sides of a pneumatic tire 8 mounted on an automobile wheel 9. Each side plate 4 is bent outward to form a U-shaped radially projecting traction lug 10. These side plates 4 are also bent circumferentially to conform to the shape of the tire 8, and their end portions are notched at 11 to form long inwardly projecting hooks 12. The two side plates 4 are connected by the tread chains 5 and which tread chains, in turn, are detachably secured to the side plates by interlocking their end links with the hooks 12 thereof. The tread chains 5 are prevented from becoming detached from the hooks 12 by bending the free ends of said hooks into the notches 11, as shown in Fig. 1.

The anchoring chains 6 and 7 are secured, one to each of the side plates 4 by inserting the links, at one of their ends, into the inner ends of the respective traction lugs 10 and securing the same thereto by rivets 13. The free end of the chain 6, which chain is considerably longer than the chain 7, is adapted to be passed over the felly of the wheel 8 and detachably and adjustably connected to the free end of the chain 7 by a hook 14. This hook 14 is pivotally attached to the link, at the free end of the chain 7, and adapted to be inserted through an extra link 15 in the chain 7 and held thereby in an operative position. Obviously, by inserting the hook 14 through one of the links in the chain 6, before interlocking the same with the link 15, the two chains 6 and 7 may be adjustably connected for securing the traction device in position on the tire 8.

It is highly important to note that the outer ends of the traction lugs 10 are located considerably inward of the tread of the tire 8, so that, under normal conditions of the roadbed, only the tread chains 5 are active to prevent both skidding and slipping. In case the roadbed is muddy, sandy or covered with snow and ice, in which the tire cuts into sufficiently to bring the traction lugs 10 into contact therewith, said traction lugs, as they project laterally from both sides of the tire, take a firm hold in the roadbed and thereby prevent the wheel from slipping or spinning. The open outer ends of the traction lugs 10 also cut into the roadbed and thereby greatly increase the hold of said traction lugs. By locating the traction lugs above the tread of the tire, it well adapts the improved traction device for driving, either on paved or dirt roads, as there can be no pounding action of the traction lugs on the pavement. When a wheel is in a rut, the traction lugs will engage the sides thereof and securely hold the wheel against slipping or spinning.

When the tread chains 5 are worn out, new ones may be substituted therefor, or by substituting tread chains of different lengths, the traction device may be used on different sized tires. To remove the tread chains 5 from the side plates 4, it is only necessary to bend the free ends of the hooks 12 out of the notches 11 by the use of a screw driver or other suitable tool. After a new chain is secured to the hooks 12, the same may be again bent into the notches 11 to prevent the said new chain from becoming detached from the side plate 4. It will thus be seen, that the only parts of the traction device that are subject to any great amount of wear, are the tread chains 5 and these may be replaced, from time to time, at a very small expense. While two of the traction devices are shown applied to the wheel, it is, of course, understood that any desired number can be used. It is also evident that these traction devices may be very quickly applied to or removed from a wheel, and, when not in use, may be stored under a seat, or other convenient place.

What we claim is:—

1. A traction device of the kind described comprising a pair of side plates having integral hooks at their ends, a pair of circumferentially spaced tread chains secured to and connecting the side plates by interlocking certain of their links with said hooks, said hooks having their ends bent in the plane of the side plates to prevent the tread chains from becoming detached therefrom, and means for securing the side plates in position on the sides of a tire.

2. A device of the kind described comprising a pair of flat side plates adapted to engage opposite sides of a tire, each of said side plates being bent outward, at its intermediate portion, to form a radially projecting traction lug, a tread chain connecting the side plates, and means for securing the side plates in position on the tire.

3. A traction device of the kind described comprising a pair of flat side plates adapted to engage opposite sides of a tire, each of said side plates being bent outwardly, at its intermediate portion, to form a radially projecting U-shaped traction lug, a tread chain connecting the side plates, and flexible means attached to said traction lugs for securing the side plates in position on the tire.

4. A traction device of the kind described comprising a pair of flat side plates adapted to engage opposite sides of a tire and having traction lugs, the end portions of the side plates being notched to form hooks, a pair of circumferentially spaced tread chains having certain of their links interlocked with the said hooks, the ends of the hooks being bent toward the side plates to prevent the tread chains from becoming detached therefrom, and means for securing the side plates in position on the sides of a tire.

5. A traction device of the kind described comprising a pair of flat side plates adapted to engage opposite sides of a tire, each of said side plates being bent outward, at its intermediate portion, to form a radially projecting traction lug, a pair of circumferentially spaced tread chains connecting the side plates, a rivet connecting the circumferentially spaced walls of each traction lug, and means attached to said rivets for securing the side plates in position on the sides of a tire.

6. A traction device of the kind described including a flat side plate adapted to engage one side of a tire, said side plate being bent outward, at its intermediate portion, to form a radially projecting traction lug, a cross tread chain attached to the side plate, and means for securing the side plate in position on the tire.

In testimony whereof we affix our signatures in presence of two witnesses.

JOHN F. SCHERER.
FREDERICK J. GEORGE.

Witnesses:
 CLARA DEMAREST,
 HARRY D. KILGORE.